United States Patent Office 3,556,722
Patented Jan. 19, 1971

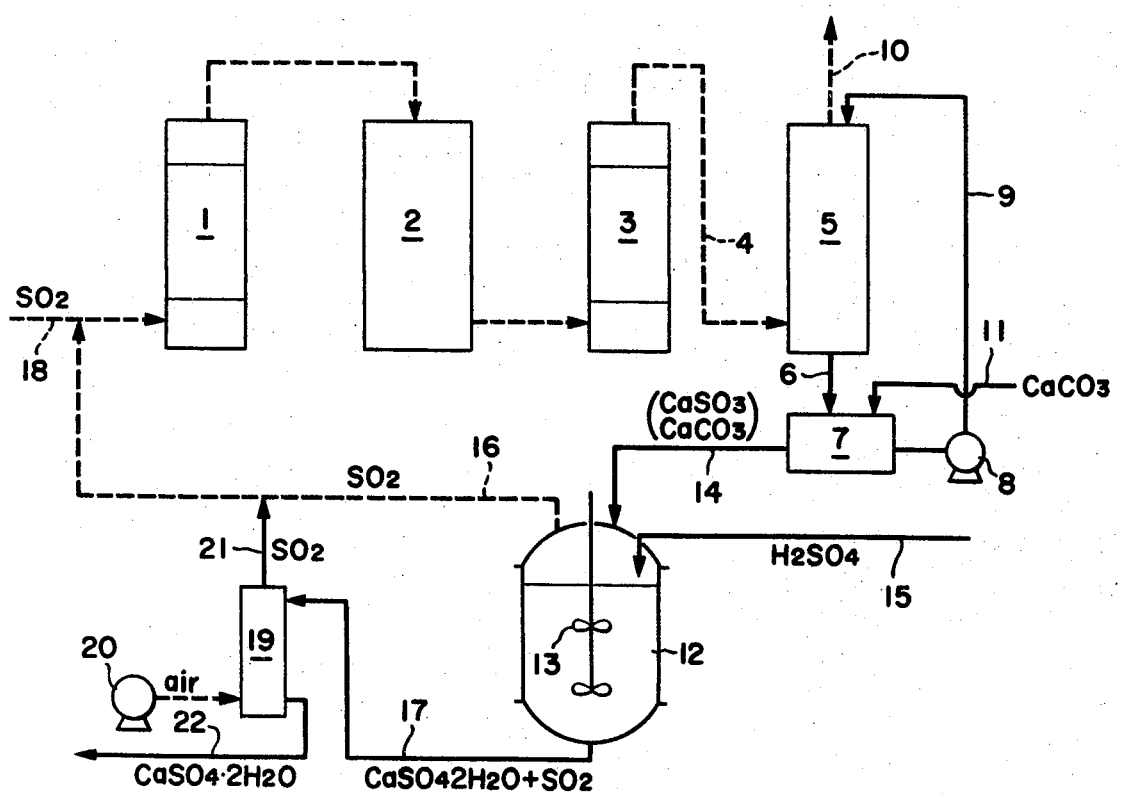

3,556,722
PROCESS FOR TREATING SULFUROUS ACID
GAS-CONTAINING EXHAUST GAS
Tooru Ōwaki, Hyogo-ken, Japan, assignor to Furukawa
Mining Co., Ltd., Tokyo, Japan
Filed Sept. 21, 1967, Ser. No. 669,537
Claims priority, application Japan, Sept. 24, 1966,
41/62,848
Int. Cl. C01b 17/60; C01f 11/46
U.S. Cl. 23—122
3 Claims

ABSTRACT OF THE DISCLOSURE

A process which comprises treating exhaust gas containing sulfurous and/or sulfuric acid gas with a solution or suspension of the hydroxide or carbonate of calcium, to produce the corresponding sulfite and/or sulfate, adding waste sulfuric acid to the liquid so obtained to convert the sulfite to the corresponding sulfate simultaneously with the evolution of sulfurous acid gas and degassing the liquid thus obtained by blowing the air thereinto, to recover the sulfate and sulfurous acid gas from the exhaust gas and consequentially eliminate a public nuisance otherwise caused thereby.

---

This invention relates to a process for removing sulfurous acid gas from the acid gas-containing exhaust gas by the absorption of the acid gas in an absorbing medium to make the exhaust gas harmless, simultaneously with producing sulfate and sulfurous acid gas by the treatment of the medium with sulfuric acid to recover the sulfate and the acid gas.

It is generally known that exhaust gas containing sulfurous acid gas ($SO_2$) and sulfuric acid gas ($SO_3$) has recently caused a serious problem, from the viewpoint of public sanitation, as to how to prevent such public nuisance. The steam-power station located in London City has long been carrying out a wet process wherein such exhaust gases are treated with lime milk to render them harmless. The most prevailing process which has recently been employed in Japan is a modification of the aforesaid lime milk process, and it comprises adsorbing sulfurous acid gas from hydroxide to yield calcium sulfite ($CaSO_3$) and then oxidizing it to calcium sulfate ($CaSO_4$) with the air (refer to Japanese Patent Gazette of Publication No. 2,662/1956).

The conventional process requires that free calcium hydroxide ($Ca(OH)_2$) and calcium carbonate ($CaCO_3$) still remaining after the absorption of the harmful gas components from the exhaust gas are converted to calcium sulfite by reacting previously prepared clean $SO_2$ with the $Ca(OH)_2$ and $CaCO_3$ because, after $CaCO_3$ is oxidized with the air to produce $CaSO_4$ in the process, the excess of $Ca(OH)_2$ and $CaCO_3$ are left unreactive thereby contaminating the $CaSO_4$ produced. Said conventional process has another disadvantage in that the efficiency of removing $SO_2$ will decrease when the removing operation is conducted in the presence of insufficient amounts of the excess of $Ca(OH)_2$ ond $CaCO_3$ in a "nuisance" remover, that is, an absorber for harmful components of exhaust gas. The process of this invention overcomes these disadvantages.

An object of this invention is to provide a process which comprises removing substantially all of sulfurous and/or sulfuric acid gas component from exhaust gas to eliminate a public nuisance otherwise caused thereby recovering the sulfurous acid gas one removed and producing plaster having superior properties, as a byproduct.

Other objects and advantages of this invention will be apparent to those skilled in the art by the following description.

The process of this invention is characterized by treating exhaust gas which contains sulfurous and/or sulfuric acid gas with an aqueous solution of calcium hydroxide or calcium carbonate to thoroughly absorb the acid gases into the solution, reacting the thus-obtained solution with sulfuric acid to produce plaster and evolve sulfurous acid gas and recovering the plaster and the acid gas. As a source of alkali, suitable compounds of magnesium, sodium, ammonia and the like may also be used in the process of this invention to cause the same reaction as the calcium compounds do.

In the practice of the process of this invention, the acid gas remover permits therein the use of calcium hydroxide or carbonate in as excessive amounts as desired because the excess salt can easily be converted to calcium sulfate when subjected to the subsequent treatment with waste sulfuric acid, whereby the absorption of the harmful gases (such as $SO_2$ and $SO_3$) from exhaust gas can be thoroughly effected and therefore the apparatus for removing the harmful gases can be stably operated with high efficiency of the removal. In addition to this advantage, the process of this invention has another advantage of producing high quality plaster simultaneously with recovering highly pure sulfurous acid gas by the treatment with waste sulfuric acid, which is very advantageous to the process even from the economical point of view.

The waste sulfuric acid which may be employed in the "sulfuric acid" treatment of the process includes waste sulfuric acid produced in the course of preparing titanium oxide, and many other ones. Therefore, the process of this invention may also be effectively used for the disposal of such waste sulfuric acids.

The process of this invention comprises the 1st step of passing exhaust gas through lime milk and the 2nd steps of treating the lime milk used with sulfuric acid, the reactions to be caused being represented by the following reaction formulae, respectively:

Reactions in the 1st step:

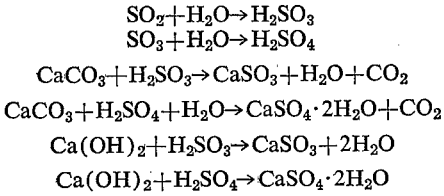

Reactions in the 2nd step:

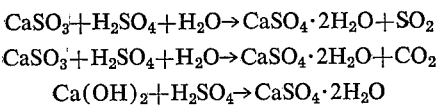

As is known from the above-mentioned formulae, the exhaust gas is completely freed of the harmful gas components initially contained therein with the evolution of $CO_2$ and $H_2O$ in the 1st step, and plaster and sulfurous acid gas ($SO_2$) are recovered in the 2nd step. As can be seen from the reactions in the 2nd step, the term "plaster" is used herein to mean calcium sulfate.

The process of this invention, when used in combination with the contact process for producing sulfuric acid, will be more fully explained with reference to the accompanying drawing.

In the drawing, numeral 1 represents a dryer for $SO_2$ gas as a starting material, numeral 2 a converter in which $SO_2$ is converted to $SO_3$, and numeral 3 an absorber in which aqueous sulfuric acid is produced.

The exhaust gas withdrawn at the top of the absorber still contains sulfurous and sulfuric acid gas left unabsorbed, which shouldn't be discharged into the atmosphere without any treatment to remove the acid gases. The exhaust gas is then introduced through pipe 4 to an acid gas remover 5 which may be of any type so far as it is structurally such that no stoppage will be caused therein. The remover is connected through pipe 6 to a tank for absorbent 7 which holds lime milk or a suspension of calcium carbonate as an absorbent. The tank 7 is also connected through pipe 9 and pump 8 to the remover 5 so that the absorbent may be circulated between the remover and tank. Numeral 10 shows an exhaust pipe provided on the top of the remover. The absorbent tank 7 is provided with pipe 11 through which the absorbent is supplied to the tank 7 is added a certain calcium compound in suitable amounts according to the amounts of $SO_2$ and $SO_3$ being absorbed in the absorbent so that the circulating absorbent may be kept in a fixed range of composition. Numeral 12 represents a closed-type reactor in which are carried out the reactions in the 2nd step of the process of this invention. The reactor 12 is provided with a suitable agitator therein, and with pipe 14 leading to the tank 7, pipe 15 for supplying sulfuric acid and pipe 16 for discharging sulfurous acid gas thereon each. It is further provided with pipe 17 for withdrawing slurried plaster thereunder. Numeral 19 represents a degassing tower in which is recovered sulfurous acid gas from slurried plaster the acid gas is dissolved in the plaster being from the reactor 12. The slurried plaster is sprayed into the degassing tower at the top thereof while the air is blown into it at the bottom thereof using a fan 20, in order to recover sulfurous acid gas from the slurry of plaster. The acid gas recovered is passed through pipe 21 to pipe 16 and the introduced pipe 18 together with that discharged from the reactor 12, the pipe 18 being connected to the apparatus for producing sulfuric acid by contact process. And the slurried plaster so degassed is withdrawn through pipe 22 at the bottom of the degassing tower 19.

In the practice of this invention in combination with the apparatus for producing "contact process" sulfuric acid, sulfurous acid gas as a starting material is passed through the dryer 1 to the converter 2 to be converted to sulfuric acid gas which is then introduced to the absorber 3 to be dissolved into sulfuric acid; and the remaining gas left undissolved, which is an "exhaust gas" in this case, is passed through pipe 4 to the acid gas remover 5. The exhaust gas is contacted with the absorber by passing upwards within the remover so that sulfurous and sulfuric acid gas still contained in the exhaust gas may completely be absorbed or dissolved thereby rendering the exhaust gas harmless and discharging it into the atmosphere via pipe 10. During the aforesaid operation, the absorbent or absorbing liquid is introduced to the remover 5 at the top thereof via pump 8 and pipe 9, passed downwards through the tower, introduced to the absorbent tank 7 in which the absorbent is replenished with fresh absorbent, and then recycled to the acid gas remover 5.

When calcium sulfite formed in the absorbent has been increased in concentration to a predetermined value, a part of the absorbent is passed through pipe 14 to the reactor 12 and then allowed to contact with sulfuric acid introduced via pipe 15 thereby to carry out the reactions in the 2nd step previously mentioned. The sulfurous acid gas produced by these reactions is supplied via 16 to pipe 18 and then used in the preparation of "contact process" sulfuric acid, while the slurry containing the resulting plaster separated is withdrawn through pipe 17 from the reactor 12.

The slurried plaster in which sulfurous acid gas is dissolved, is introduced via pipe 17 to a degassing tower where the plaster is degassed using the air.

The sulfurous acid gas liberated from the plaster is supplied to pipe 21, and then passed through pipe 16 to pipe 18 together with the sulfurous acid gas withdrawn from the reactor 12, the pipe 18 leading to the apparatus for producing "contact process" sulfuric acid.

This invention will be better understood by the following examples, which are each a practice of this invention on a laboratory scale.

EXAMPLE 1

To a three-necked flask containing 2 liters of a suspension of calcium carbonate (the suspension being 145 g./l. in concentration) was introduced a exhaust gas containing 0.3% $SO_2$ at a rate of 2.5 l./min. for 7,600 minutes in order to absorb the $SO_2$ into the suspension, whereby there was obtained a slurry the solid matter of which consisted of 15% $CaCO_3$ and 85% $CaSO_3$. The absorption rate of sulfurous acid gas could be kept at a value of 97% throughout this operation.

To the flask were then poured under agitation, 2,640 cc. of waste sulfuric acid (this acid containing 10% $H_2SO_4$) to react it with the aforesaid calcium salt and liberate the $SO_2$ from the slurry. Gas evolved from the slurry during the reaction was collected, and $SO_2$ was recovered by blowing the air into the slurry after the completion of the reaction. The gas and the $SO_2$ so obtained were combined and then analyzed with the result that the $SO_2$ was 4.6% in concentration and 85% in recovery ratio.

The liquid in the flask had a pH value of 1.2, and the plaster crystallized from the liquid had very superior properties and the following analysis: $SO_3$, 46.08; CaO, 33.06%; $Fe_2O_3$, 0.018%; free CaO, 0.57%; water of crystallization, 17.47%.

EXAMPLE 2

Exhaust gas containing 0.3% $SO_2$ was introduced at a rate of 3.0 l. min. to a three-necked flask containing 2 liters of a suspension of $Ca(OH)_2$, the suspension being 200 g./l. in concentration, to effect the absorption of the $SO_2$ thereinto. The absorption rate exceeded 99% when the pH value of the suspension reached 1.3, and it was 98% when the pH value was 1.2.

To the suspension so obtained was added waste sulfuric acid (this acid containing 10% sulfuric acid) at a rate of 27.4 cc./min. for 180 minutes to recover $SO_2$ evolved by the reactions taking place in the resulting mixture. After the completion of the reactions, the $SO_2$ absorbed in the reaction mixture was also recovered by blowing the air thereinto. The recovery ratio of $SO_2$ was 85%, and the concentration of $SO_2$ contained in said combined recovered gases was 4.5%.

The plaster separated from the liquid at pH 1.2 had the following analysis which showed the excellent properties of the plaster. Analysis: $SO_3$, 46.10%; CaO, 32.28%; $Fe_2O_3$, 0.021%; free CaO, 0.34%; water of crystallization, 18.01%.

EXAMPLE 3

In this example, gas-liquid equilibrium concentration at various pH's were determined in order to find out the optimum conditions under which sulfurous acid gas is recovered by degassing the slurry dissolving therein the acid gas, obtained after the decomposition of a certain sulfite with sulfuric acid. The results obtained were as follows:

$$CaSO_3 + H_2SO_4 \rightarrow CaSO_4 + SO_2 + H_2O \quad (1)$$

| pH | 1.2 | 1.8 | 2.0 | 2.5 | 3.0 |
|---|---|---|---|---|---|
| $SO_2$ dissolved (l./l.) | 3.3 | 3.1 | 3.4 | 3.4 | 2.9 |
| E. C. G. (percent) | 5.1 | 2.5 | 1.7 | 0.5 | 0.3 |
| $SO_2$ dissolved (l./l.) | 4.7 | 4.8 | 5.2 | 5.1 | 4.1 |
| E. C. G. (percent) | 6.6 | 3.6 | 3.2 | 0.7 | 0.4 |

E.C.G.=equilibrium concentration of gas.

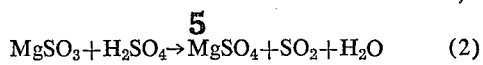

| pH | 1.2 | 1.5 | 1.8 | 2.2 | 3.0 |
|---|---|---|---|---|---|
| SO₂ dissolved (l./l.) | 3.1 | 3.6 | 3.0 | 2.2 | 2.5 |
| E.C.G. (percent) | 4.5 | 4.0 | 2.2 | 1.2 | 0.4 |
| SO₂ dissolved (l./l.) | 5.5 | 5.8 | 5.7 | 5.7 | 5.8 |
| E.C.G. (percent) | 9.1 | 7.8 | 4.5 | 1.7 | 0.7 |

| pH | 1.2 | 1.5 | 1.8 | 2.2 | 3.0 |
|---|---|---|---|---|---|
| SO₂ dissolved (l./l.) | 4.0 | 4.1 | 3.6 | 3.8 | 4.1 |
| E.C.G. (percent) | 5.0 | 4.7 | 3.3 | 2.2 | 1.1 |
| SO₂ dissolved (l./l.) | 7.4 | 7.3 | 8.2 | 8.5 | 8.4 |
| E.C.G. (percent) | 9.1 | 8.9 | 6.4 | 4.1 | 1.1 |

These results clearly show that it will be hardly possible to recover the SO₂ dissolved in the mixture therefrom at a pH value of more than 3.0.

EXAMPLE 4

In this example, the process of this invention was employed in the treatment of exhaust gas from the plant (200 tons/day) of "contact process" sulfuric acid.

The exhaust gas, which was at 52° C. and contained SO₂ in the concentration of 2,200–2,800 p.p.m., was introduced at a flow rate of 440 Nm.³/min. to an acid gas remover (1,700 mm.φ×15,000 mm. height) in which was placed an absorbing liquid (slurry concentration, 130 g./l; flow rate, 2.3 m.³/min.; and pH, 6.2) containing CaCO₃, CaSO₃, CaSO₄ and the like, to decrease the SO₂ concentration in the exhaust gas to 50–120 p.p.m. with an absorption rate of 95%.

A slurry (concentration: Ca. 160 g./l.) from the sedimentation tank of the acid gas remover unit was introduced at a rate of 60 l./min. to the reactor provided with an agitator therein and then the waste sufuric acid (concentration: 80–100 g./l.) was added at a rate of approximately 100 l./min. to the reactor thereby adjusting the pH of the slurry so obtained to less than 1.5.

The SO₂ dissolved in the slurry was recovered therefrom by spraying the overflow from the reactor into the degassing tower at the top thereof while blowing the air at a rate of 25–30 m.³/min. into the tower at the lower part thereof. The degassing ratio in this case was dependent upon the pH of the slurry, and it was 80–85% at a pH of less than 1.5. And the concentration of the SO₂ contained in the combined gases recovered from the reactor and the degassing tower.

What is claimed is:

1. In a process for treatment of exhaust gases containing a member selected from the group consisting of SO₂, SO₃ and mixtures thereof, wherein the exhaust gas is introduced into an alkaline absorbing liquid containing a member from the group consisting of calcium hydroxide, calcium carbonate, and mixtures thereof to form the corresponding sulfite and sulfate and liberate sulfur dioxide, and said liberated sulfur dioxide is recovered, the improvement which comprises adding dilute sulfuric acid to said resulting liquid in an amount to obtain a pH of said resulting liquid of not more than 3, and stripping the thus acidified liquid by flowing air through the acidified liquid while the pH of the acidified liquid is maintained at not more than 3.

2. The process of claim 1, wherein the dilute sulfuric acid is a waste sulfuric acid.

3. The process of claim 1, wherein the dilute sulfuric acid has a concentration of 10% sulfuric acid.

References Cited

UNITED STATES PATENTS

| 2,718,453 | 9/1955 | Beckman | 23—122X |
| 2,655,340 | 10/1953 | Schiermeier | 23—122 |
| 2,676,090 | 4/1954 | Johnstone | 23—178 |
| 2,862,789 | 12/1958 | Burgess | 23—119 |
| 3,431,072 | 3/1969 | Rozie et al. | 23—2X |

FOREIGN PATENTS

| 1,033,235 | 6/1966 | Great Britain | 23—178 |

OTHER REFERENCES

Pascual: Nouveau Traite de Chimie Minerale, vol. IV, Libraires de l' Academic de Medecine, Paris, 1958, pp. 415–17.

OSCAR R. VERTIZ, Primary Examiner

G. O. PETERS, Assistant Examiner

U.S. Cl. X.R.

23—178